Patented July 22, 1947

2,424,224

UNITED STATES PATENT OFFICE 2,424,224

ANTISEIZE COMPOSITION

Bernard Costello, Riverside, N. J.

No Drawing. Application August 3, 1945,
Serial No. 608,825

1 Claim. (Cl. 252—29)

(Granted under the act of March 3, 1883, as
amended April 30, 1928; 370 O. G. 757)

This invention relates to new and useful improvements in anti-seize compositions, and more particularly to anti-seize compositions which are capable of standing up under high temperatures.

One of the difficulties commonly encountered in internal combustion engines, and particularly aircraft engines, is the tendency for the spark plugs and other threaded fittings therein to become frozen or seized in the engine with the result that they either cannot be removed at all or can be removed only with extreme difficulty and loss of valuable time. For this reason, it is the practice currently to coat the threaded portions of such spark plugs and other fittings with a compound or composition that is intended to prevent freezing or seizure of the plugs and fittings in the engine.

Internal combustion engines, and particularly aircraft engines, however, operate at relatively high temperatures, and existing anti-seize compounds and compositions have not proven satisfactory for their intended purpose due to the fact that such existing materials break down and become ineffective at the high temperatures generated by the engines.

With the foregoing in mind, the principal object of the present invention is to provide a novel anti-seize composition which is operable to effectively preclude the seizure or freezing of threaded fittings in a body under both normal and elevated temperature conditions.

Another object of the present invention is to provide a novel anti-seize composition that is highly resistant to heat and which is not adversely or deleteriously affected thereby.

Another object of the invention is to provide a novel anti-seize composition of the type described which is not explosive and which fully retains its efficient lubricating properties and characteristics under very high temperatures.

A further object of the invention is to provide a novel anti-seize composition having the features and characteristics set forth which is comparatively simple and inexpensive to manufacture, and highly efficient and effective in use.

These and other objects of the invention, and the various features and details in respect to the composition and use thereof, are hereinafter fully set forth and described.

In general, the present invention resides in the discovery that a composition comprising an admixture of suitable proportions of finely powdered graphite, sperm (whale) oil and petroleum jelly (petrolatum) may be employed effectively to prevent the seizure or freezing of threaded joints and connections in environments subjected to high temperatures. Such a composition is not explosive, and is characterized by its uniformly satisfactory lubricating properties at both high and low temperatures.

The finely powdered graphite ingredient of the composition functions principally as the anti-seize lubricant to prevent seizure or freezing of the threaded joint or connection to which the composition is applied; and its characteristics and properties are not affected or destroyed by high temperatures.

The sperm (whale) oil likewise imparts lubricating properties to the composition in that it serves effectively to lubricate the graphite particles within and between the threads of the joint or connection to which applied. This oil is characterized by its high heat resisting properties and, therefore, does not burn away at high temperatures and leave the graphite particles devoid of lubrication with resulting granulation and caking of the graphite in and between the threads of the joint or connection.

The petrolatum or petroleum jelly ingredient functions as a binder for the graphite and sperm oil ingredients of the composition, and effectively maintains the graphite particles and the sperm oil uniformly distributed and dispersed through the mass of the composition. The petrolatum is not materially affected by high temperatures and therefore, the consistency and density of the composition and the dispersion of the graphite particles therethrough is retained under substantially high temperature conditions.

The proportions of the several ingredients in the composition may vary according to the particular use to which it is to be put, and the range of temperature conditions to which it will be subjected. Thus, the finely powdered graphite present in the composition may vary from about five parts to nine parts thereof by volume, depending upon the temperature conditions in which employed. For example, in the case of a heavy duty engine developing high temperatures during operation, a larger proportion of graphite is used, whereas in the case of a light duty engine developing relatively lower temperatures, smaller amounts of graphite may be employed effectively.

The sperm (whale) oil present in the composition may vary from about three parts to seven parts thereof by volume, according to the proportion of graphite present therein. Thus, in a composition containing, for example, five parts graphite there may be present in the composition, for example, about seven parts sperm oil, and in a composition containing, for example, nine parts graphite there may be present about three parts sperm oil. The petrolatum or petroleum jelly is present in the composition in from about one part to three parts thereof by volume, depending upon the consistency of the composition that is required or desired.

Compositions made according to the present invention that have given satisfactory results in preventing the seizure or freezing, for example, of the spark plugs threaded in relatively light duty, medium-heavy duty and heavy duty aircraft engines, respectively, are given in the following examples:

*Example I.—Light engines*

| | Parts by volume |
|---|---|
| Powdered graphite | 5 |
| Sperm oil | 7 |
| Petrolatum | 2 |

*Example II.—Medium-heavy engines*

| | Parts by volume |
|---|---|
| Powdered graphite | 8 |
| Sperm oil | 5 |
| Petrolatum | 1 |

*Example III.—Heavy engines*

| | Parts by volume |
|---|---|
| Powdered graphite | 9 |
| Sperm oil | 3 |
| Petrolatum | 3 |

The composition of the present invention may be prepared or manufactured by placing the selected quantity of finely powdered graphite in a suitable mixing vessel. The sperm oil is then added to the graphite, and the oil and graphite are thoroughly mixed together until the ingredients are uniformly distributed and dispersed relative to one another throughout the mass. The selected amount of petrolatum is then added to the graphite-sperm oil mixture and thoroughly mixed therewith to serve as a binder and maintain the desired uniformity of distribution and dispersion of the sperm oil and graphite particles throughout the entire mass of the composition. When the composition has been manufactured as described, it may be packed for shipment and storage in jars, cans, collapsible tubes or other suitable containers as desired.

To use the anti-seize composition of the present invention, it is merely necessary to apply and spread the composition upon the threads of one of the members to be secured together, and when the members are threaded together the composition on the one member is satisfactorily distributed between the surfaces of the interengaged threads to prevent them from becoming seized or frozen together as the result of relative expansion thereof under high temperatures.

The sperm oil ingredient of the composition effectively lubricates the particles of graphite within and between the threads of the joint or connection, and since it is highly resistant to heat, the sperm oil will not burn away leaving the graphite particles devoid of lubrication resulting in granulation and caking of the graphite. The graphite particles and the sperm oil are effectively maintained uniformly distributed and dispersed throughout the mass of the composition, and the desired consistency thereof is retained by the use of the petrolatum binder.

From the foregoing it will be apparent that the present invention provides a novel anti-seize composition which is operable effectively to prevent the seizure or freezing of threaded joints and connections, and which is highly resistant to, and not adversely or deleteriously affected by, high temperatures. The invention also provides a novel anti-seize composition which retains its efficient properties and characteristics under both normal and elevated temperature conditions. Furthermore, the invention provides a novel anti-seize composition that is comparatively simple and inexpensive to manufacture and highly efficient in use.

While certain embodiments of the present invention have been disclosed herein, it is not intended to limit the invention to such disclosure, and changes and modifications may be made therein and thereto within the scope of the claim.

The invention described herein may be manufactured and used by or for the Government of the United States of America for governmental purposes without the payment of royalties thereon or therefor.

I claim:

An anti-seize composition for spark plug threads subject to extreme temperature variation in use, said composition consisting of a uniformly dispersed mixture of 5 to 9 parts by volume powdered graphite, 3 to 7 parts by volume sperm oil and a binding agent consisting of 1 to 3 parts by volume of petrolatum.

BERNARD COSTELLO.

REFERENCES CITED

The following references are of record in the file of this patent:

UNITED STATES PATENTS

| Number | Name | Date |
|---|---|---|
| 621,057 | Frost | Mar. 14, 1899 |
| 1,590,800 | Becker | June 29, 1926 |
| 2,065,248 | Smith | Dec. 22, 1936 |

FOREIGN PATENTS

| Number | Country | Date |
|---|---|---|
| 20,476 | Great Britain | Nov. 14, 1896 |